UNITED STATES PATENT OFFICE.

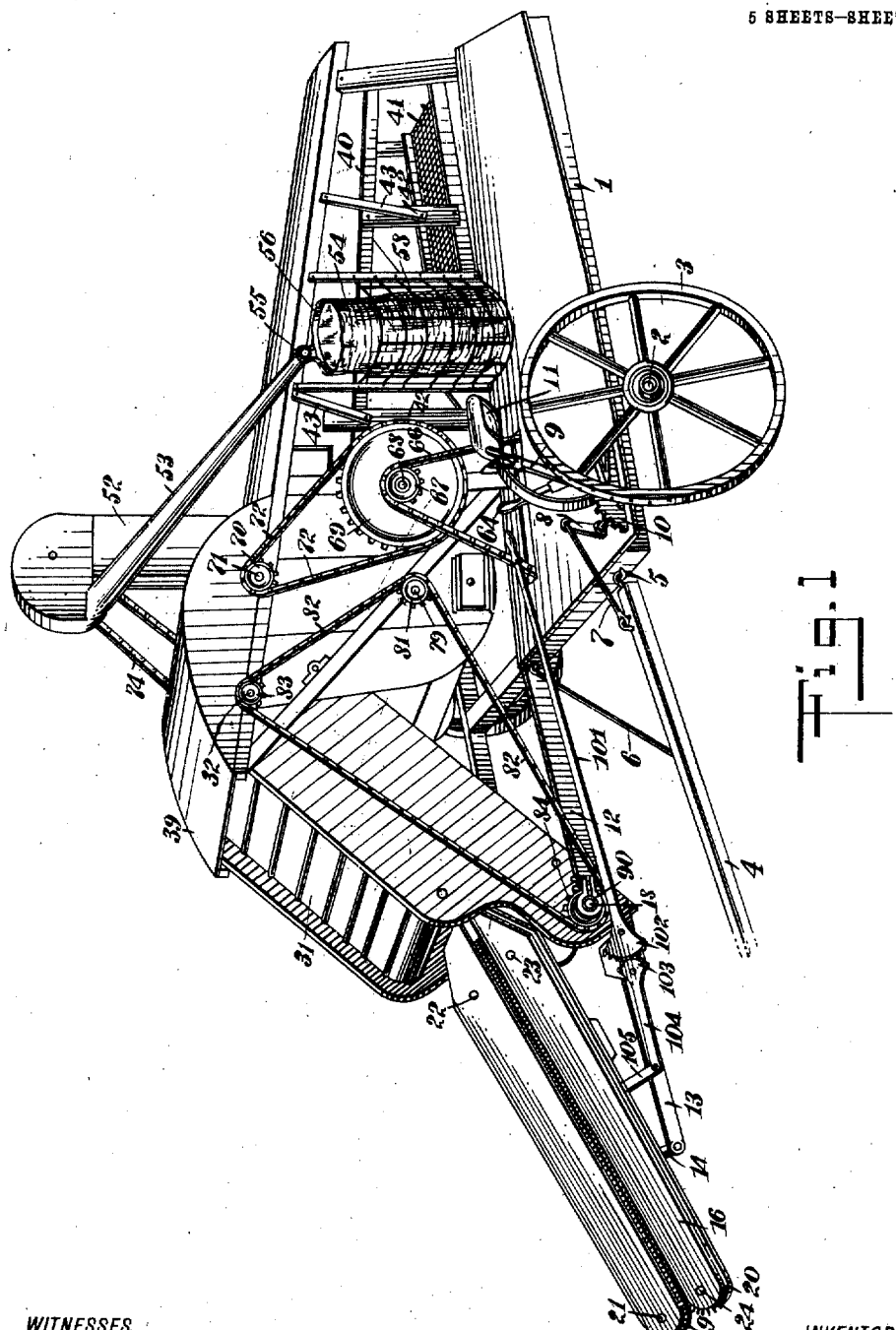

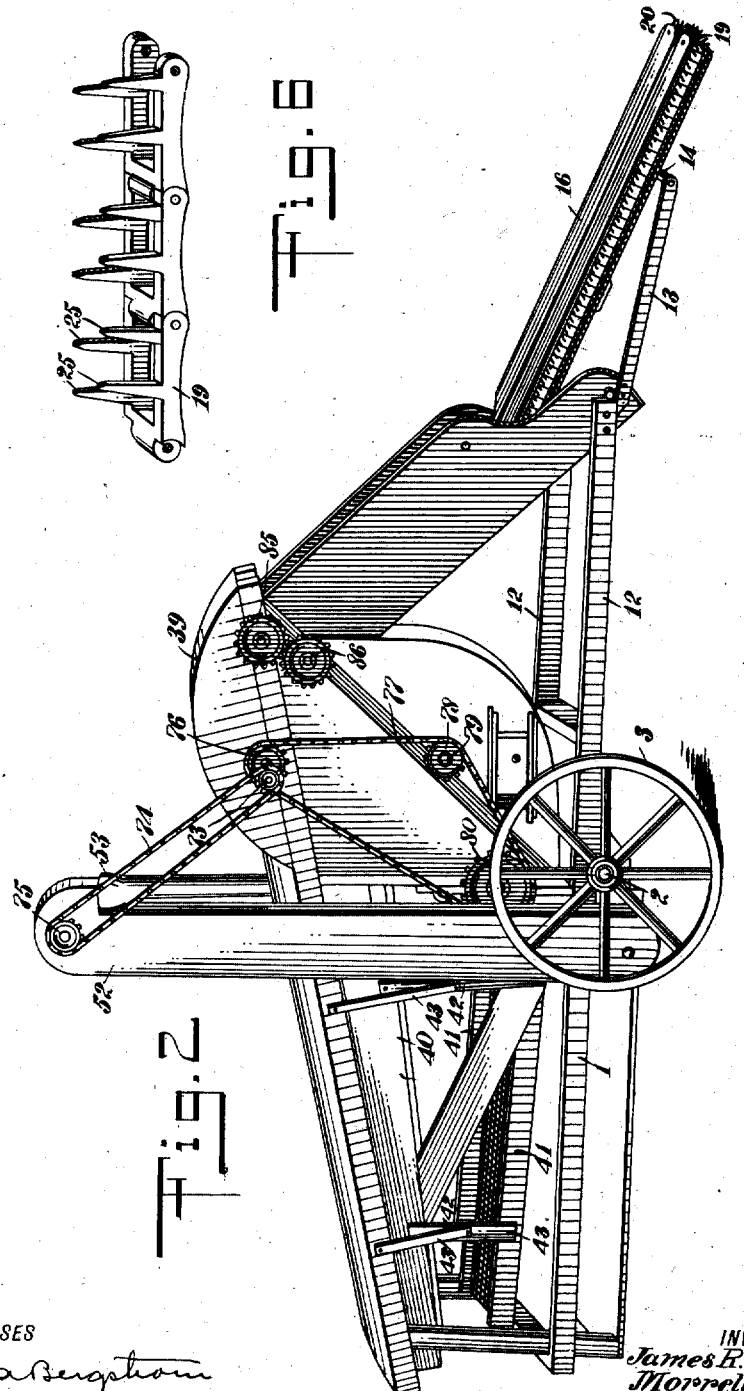

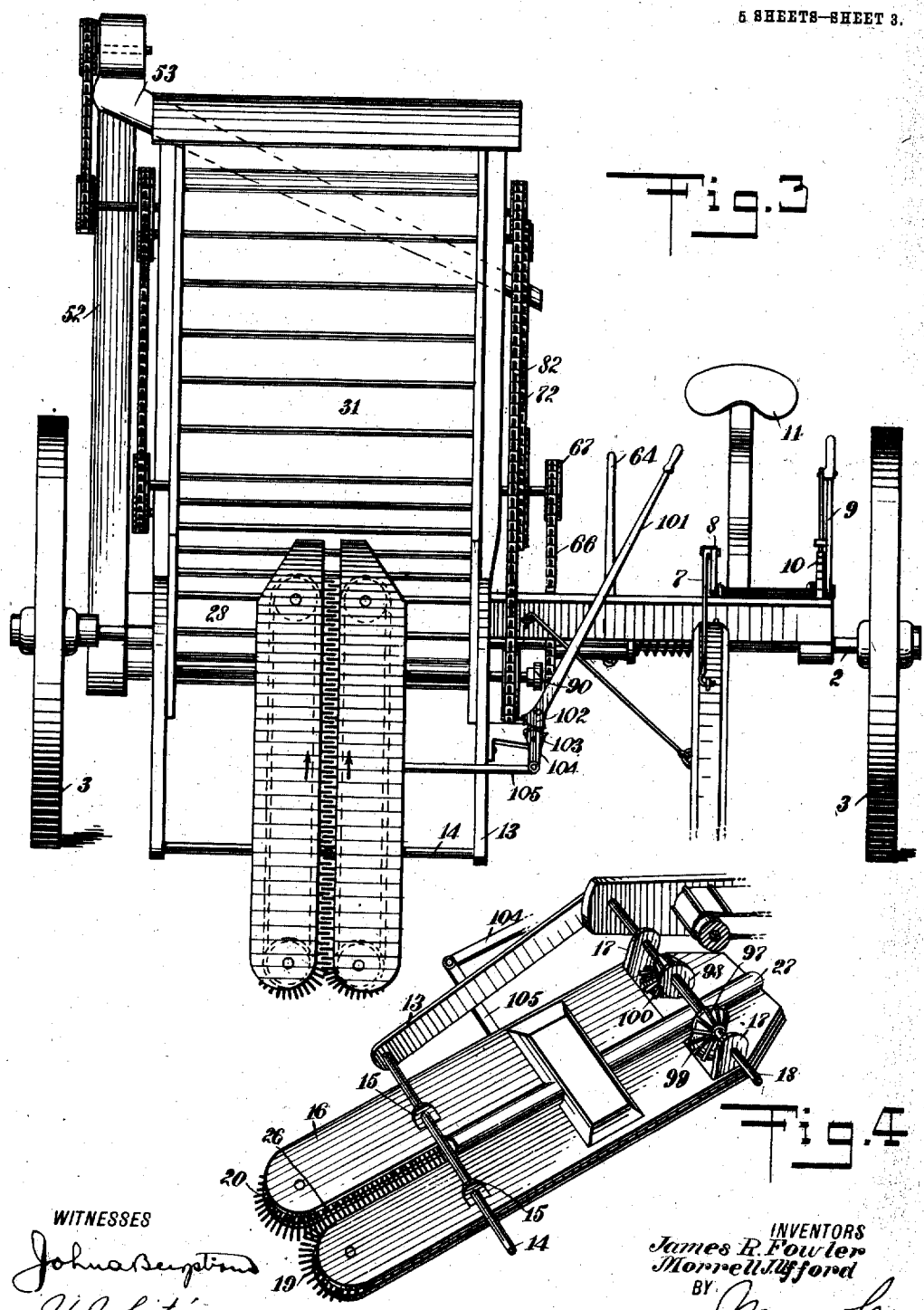

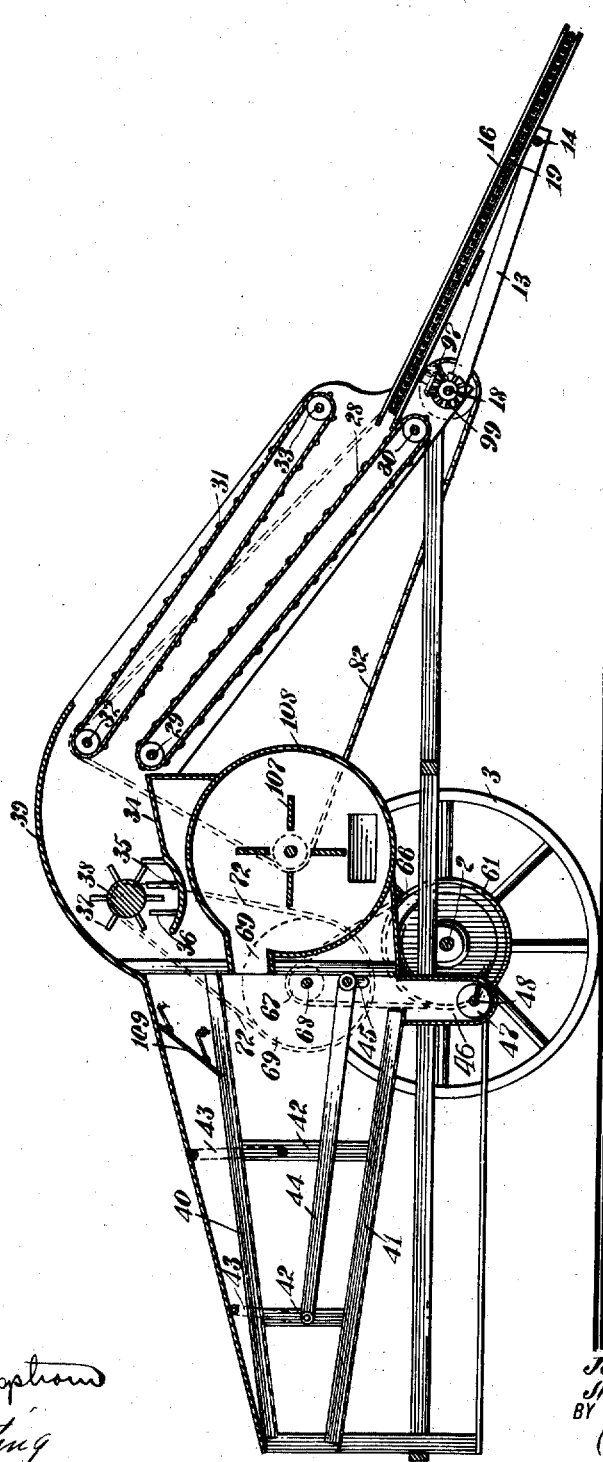

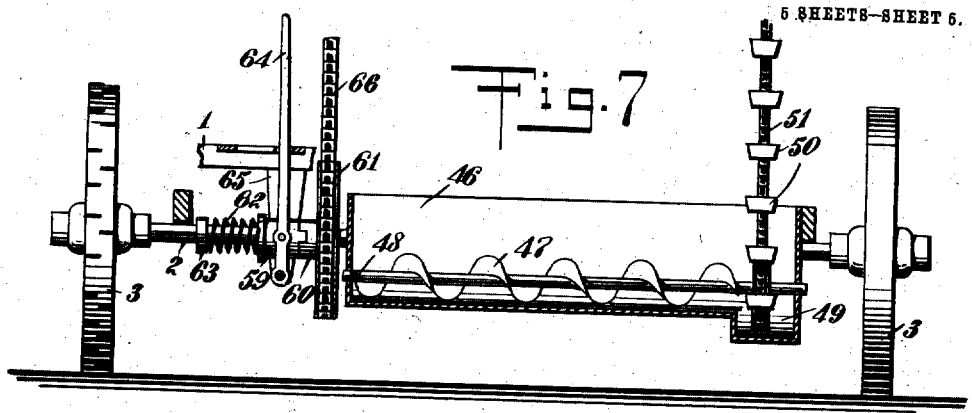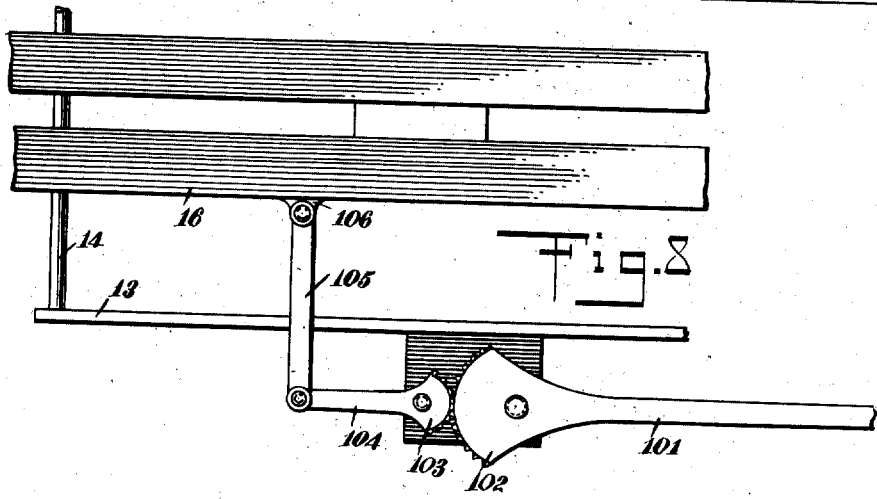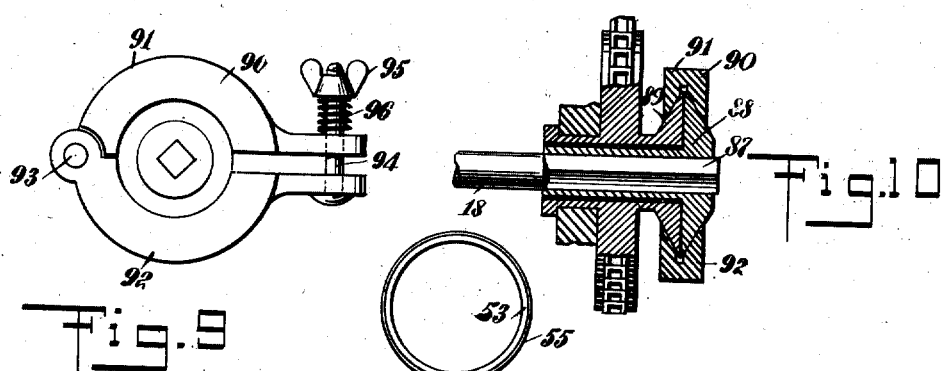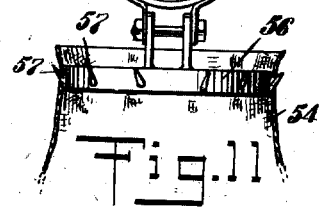

JAMES ROBERT FOWLER AND MORRELL JOHN UFFORD, OF AMENIA, NORTH DAKOTA.

BEAN-HARVESTER.

991,293.   Specification of Letters Patent.   Patented May 2, 1911.

Application filed August 7, 1909. Serial No. 511,760.

*To all whom it may concern:*

Be it known that we, JAMES R. FOWLER and MORRELL J. UFFORD, both citizens of the United States, and residents of Amenia, in the county of Cass and State of North Dakota, have invented a new and Improved Bean-Harvester, of which the following is a full, clear, and exact description.

This invention relates to a new and improved machine for harvesting beans and the like and separating them from the stalks and chaff. The usual method of harvesting beans is to pull them by hand and pile them on the ground until ready for threshing. This renders them liable to be spoiled by dampness and by mixing with dirt.

The object of this invention, therefore, is to provide a device which will automatically pull the vines, thresh the beans from the stalks, separate the beans from the chaff, and sack the separated beans.

A further object of the invention is to provide a device which will be simple in construction, easily operated, and at the same time strong and durable.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a perspective view, in elevation, of our device; Fig. 2 is a perspective view, in elevation, taken from the opposite of the view shown in Fig. 1; Fig. 3 is a front view in elevation; Fig. 4 is a bottom perspective view of the pulling mechanism, showing its adjustable connection with the frame; Fig. 5 is a vertical longitudinal section; Fig. 6 is an enlarged perspective view, showing a section of the pulling chain; Fig. 7 is a vertical transverse section through the screw conveyer casing; Fig. 8 is an enlarged fragmentary plan view, showing the method of adjusting the pulling mechanism; Fig. 9 is an enlarged vertical end view of the clutch connecting the pulling mechanism to the driving gear; Fig. 10 is a vertical side view of Fig. 9, partly in section to show the underlying members; and Fig. 11 is a vertical view, showing the method of supporting the sack to be filled.

Referring more particularly to the separate parts of the device, 1 indicates a carriage, which is supported by means of a shaft 2 on a plurality of wheels 3, which are preferably secured to the shaft 2 and have roughened treads, so as to form a good gripping surface.

At the forward end of the carriage 1, there is provided a suitable pole 4, which is pivotally secured in any well-known manner to the carriage 1 at 5, and is braced to the carriage by any suitable means, such as a brace 6.

In order to adjust the pole 4 relative to the carriage 1, there is provided a suitable connecting link 7, which is secured to the pole 4 in any well-known manner at one end, and pivotally secured at its opposite end to one arm 8 of a bell-crank lever, which is pivotally secured in any well-known manner to the carriage 1, and has an operating arm 9, which is adapted to be locked to a stationary sector 10 in the usual manner.

Adjacent to the operating arm 9 on the carriage 1, there is provided a suitable seat 11 for the operator. Extending from the front end of the carriage 1, there is provided a suitable supporting frame 12, to which is secured in any well-known manner a supplementary supporting frame 13. At the outer end of the frame 13, there is provided a transverse shaft 14, on which is slidingly supported in any well-known manner, as by means of brackets 15, a frame 16 for the pulling mechanism. This frame 16 is also slidingly supported at its rear end by means of brackets 17 on a drive-shaft 18.

On the frame 16, there are provided a pair of endless chain conveyers 19 and 20, which are supported on suitable guide-wheels secured to shafts 21, 22, 23 and 24, rotatably supported on the frame 16. The chain conveyers 19 and 20 are of a peculiar form (shown most clearly in Fig. 6) and consist of pivotal links having a plurality of spikes or fingers 25, secured to their opposite sides and arranged in staggered relation.

The frame 16 is so constructed at its lower end as to form a slot or path 26, through which the plants are pulled by means of the fingers 25 on the chains 19 and 20. The upper end of the frame 16, however, has a supporting apron 27 on the under side, which is adapted to receive the plants and guide them on their upward travel. The pulling chains 19 and 20 deliver the plants on top of an endless belt conveyer 28, which is rotatably supported on rollers on shafts 29 and 30. Co-acting with the endless conveyer 28 and located above it, there is provided a similar belt conveyer 31, which is rotatably supported on rollers on the shafts 32 and 33. The endless conveyers 28 and 31 act to drag the plants between them and carry them upward, to be delivered onto an apron 34, whence they slide into a concave 35, which has upwardly-extending teeth 36 thereon, which co-act with teeth 37 on a rotatable cylinder 38, to beat the plants and separate the beans from the pods.

There is provided a suitable inclosing casing for the concave and cylinder, which has a cap 39, that is preferably removable, so that access may be had to the interior of the machine. The cylinder 38 rotates in such a manner as to throw the material treated by it onto a screen 40, which has openings therein of such a size as to permit the beans and small chaff and dirt to fall through, but retain the large portions of the plants. To prevent the cylinder 38 from throwing the material clear off the end of the screen 40, there is provided a shield or guard 109, which is adjustably secured above the screen 40. The beans and other small particles which pass through the screen 40 drop onto a similar screen 41, which is preferably inclined toward the front of the machine, and has openings therein of such a size as to permit the dust and dirt to fall through and at the same time retain the separated beans thereon.

The screens 40 and 41 are connected by a suitable frame 42, which is pivotally secured to the body of the carriage by any suitable means, such as connecting links 43. The shaking motion of the screens 40 and 41 is obtained by means of a connecting link 44, which is pivotally connected to the frame 42 at one end, and pivotally connected to a crank on a crank shaft 45. The screens 40 and 41 are aided in their separating action by means of a blower fan 107, which is inclosed in a casing 108, and directs a current of air beneath the screen 40, whereby the light chaff is blown out at the rear end of the harvester.

The lower shaking screen 41 delivers the separated beans into a casing 46, in the bottom of which there is provided a screw conveyer 47 which is secured on a shaft 48, and delivers the beans into a boot 49 in the casing 46, from which they are scooped out by means of buckets 50 on an endless conveyer 51, which passes over a suitable sprocket on the shaft 48, and which is adapted to rotate the screw conveyer 47. The conveyer 51 is inclosed in a casing 52, and extends upwardly to a point where it delivers the separated beans into a spout 53, which extends across the carriage 1 and is adapted to deliver the beans into a sack 54.

In order to support the sack 54, there is provided (as clearly shown in Fig. 11) a clamping ring 55, which grips the extremity of the spout 53 and has pivotally secured thereto a suspending ring 56, which is provided with a plurality of sharp prongs 57, on which the sack 54 is adapted to be supported. In order to prevent the sack 54 from being blown or shaken, there is provided a wire guard or screen 58, which incloses the sack and is secured to the carriage 1 in any suitable manner. The machine is driven from the supporting wheels 3 which are secured on the shaft 2, by means of a clutch 59, which is splined onto the shaft 2 and is adapted to engage a clutch 60 on a sprocket wheel 61, which is loosely mounted on the shaft 2. The clutch 59 is normally held in engagement with the clutch 60 by means of a spring 62, which engages the clutch 59 at one end and a collar 63 on the shaft 2 at the other end. The clutch 59 is manipulated by means of a hand lever 64, which is pivotally secured in any well-known manner to a bracket 65 on the carriage 1, and extends in proximity to the seat 11, where it may be readily grasped by the operator.

The sprocket wheel 61 drives a chain 66, which extends upwardly through the floor of the carriage 1, and drives a smaller sprocket wheel 67 secured on a shaft 68. Also secured on the shaft 68, there is provided a large sprocket wheel 69 which drives another sprocket wheel 70 on a shaft 71 by means of a drive-chain 72. The shaft 71 drives the cylinder 38, which is secured thereto and also extends beyond the frame on the other side, and has a sprocket wheel 73 secured at its outer end, which is adapted to drive, by means of a chain 74 and a sprocket 75, the elevating conveyer 51.

Intermediate the sprocket wheel 73 and the casing, on the same shaft 71, there is secured another sprocket 76, which drives a chain 77, which in turn is adapted to rotate a sprocket-wheel 78 on a fan-shaft 79, and a sprocket-wheel 80 on the crank shaft 45. The fan shaft 79 extends through the casing to the opposite side, where there is provided another sprocket 81, which is adapted to drive by means of an endless chain 82, a sprocket wheel 83, secured to the shaft 32 which drives the conveyer 31, and a sprocket 84, which drives the shaft 18.

The shaft 32 has on its opposite end a gear 85, which meshes with a corresponding gear 86 on the shaft 29, and thereby drives the lower conveyer 28. The sprocket-wheel 84 is not directly connected to the shaft 18, but connected thereto by means of a clutch, which prevents the breakage of parts by permitting the driving mechanism to slip relative to the shaft 18 in case of an overload on the pulling mechanism. This connection is most clearly shown in Figs. 9 and 10, in which it is shown that the shaft 18, has an angular portion 87, on which is secured a clutch disk 88. The sprocket wheel 84 also has a clutch disk 89 preferably integral therewith, which is adapted to be secured in driving relation with the clutch disk 88 by means of a clamp 90, which comprises two members 91 and 92, pivoted together at 93. The members 91 and 92 are adapted to be held in yielding clamping engagement with the clutches 88 and 89 by means of a screw 94, which has a thumb-screw 95 on the outer end thereof, and upon which is threaded a spiral spring 96, interposed between the thumb-screw 95 and the clamping member 91.

The shaft 18 has a pair of bevel-gears 97 and 98 splined thereon, which are adapted to drive bevel-gears 99 and 100, secured on the shafts 22 and 23. By this means, the puller chains 19 and 20 are driven.

As previously mentioned, the frame 16 is adjustably supported on the shafts 14 and 18, and by reason of the fact that the driving gears 97 and 98 are splined onto the shaft 18, the driving means will always be in driving relation with the conveyers 19 and 20. The purpose of adjusting the frame 16 with the pulling conveyers 19 and 20 is in order that the slot 26 may be held opposite the row of plants. In order to do this, there is provided a lever 101, the handle of which is juxtaposed to the seat 11 within easy reach of the operator, and which is pivoted near its other end to the frame 13. At the other end of the lever 101 there is provided a sector-gear 102, which engages a corresponding sector-gear 103 on a lever 104, which is pivotally connected at its opposite end by means of a connecting link 105 to a bracket 106 on the frame 16.

In the operation of the device, the carriage is drawn by means of horses, mules or the like, attached to the pole 4, and the frame 16 is adjusted so as to bring the slot 26 in alinement with a row of plants. The pulling chains 19 and 20 receiving their drive indirectly from the wheels 3, tend to draw the stalks along between them and forcibly remove them from the ground and convey them upwardly to the opposite ends, where they are deposited on the conveyer 28. The conveyer 28, assisted by the conveyer 31, further elevates the plants and deposits them on the apron 34, where they are drawn into the sphere of action of the teeth on the beater cylinder 38 and the concave 35. Here the plants are beaten, and the beans or the like separated from the pods and thrown onto the screen 40.

The shield 109 prevents the cylinder 38 from kicking the material too far over the screen 40. The screen 40 is shaken by means of the crank shaft 45, and gradually sifts the beans and small particles of chaff from the large portions of stalks, the former passing through to the screen 41 below, and the latter being shaken off the end of the screen 40 onto the ground.

The screening action is aided by the fan 107, which tends to blow the light material out at the rear end of the harvester. The screen 41 is also shaken by the crank shaft 45, and gradually permits the dirt and small particles to fall through and leaves behind the clean beans, which are deposited in the casing 46, where they are conveyed by the screw 47 into the boot 49. Here the buckets 50 on the conveyer 51 elevate the beans and deposit them into the spout 53, from whence they slide into a waiting sack 54.

The levers 101 and 104 provide means for adjusting the pulling mechanism frame 16, so as to follow any irregularities in the row of plants. The yielding drive between the wheels and the pulling mechanism permits the pulling mechanism to remain idle in case it becomes clogged or overloaded, and thus prevents any possible breakage of the pulling chains.

There is thus provided a simple and efficient device, which will pull the stalks from the ground and separate the beans from the pod in a clean and thorough manner.

Having thus described our invention, we claim as new and desire to secure by Letters Patent:—

1. In a harvester, the combination with a carriage, of a pulling mechanism bodily adjustable transversely on said carriage, a conveying mechanism juxtaposed to said pulling mechanism, a beater connected to said conveying mechanism, and screening means connected to said beater.

2. In a harvester, the combination with a carriage, of a pulling mechanism bodily adjustable transversely on said carriage, a conveying mechanism juxtaposed to said pulling mechanism, a beater connected to said conveying mechanism, screening means connected to said beater, and sacking means connected to said screening means.

3. In a harvester, the combination with a carriage, of a pulling mechanism bodily adjustable transversely on said carriage, a conveying mechanism juxtaposed to said pulling mechanism, a beater connected to said conveying mechanism, screening means connected to said beater, conveying means connected to said screening means, and sacking means connected to said conveying means.

4. In a harvester, the combination with a carriage, of a pulling mechanism bodily adjustable transversely on said carriage, a conveying mechanism juxtaposed to said pulling mechanism, a beater connected to said conveying mechanism, screening means connected to said beater, a blower fan adapted to aid said screening means, conveying means connected to said screening means, and sacking means connected to said conveying means.

5. In a harvester, the combination with a carriage, of a pulling mechanism bodily adjustable transversely on said carriage, a conveying mechanism juxtaposed to said pulling mechanism, a beater connected to said conveying mechanism, screening means connected to said beater, a blower fan adapted to aid said screening means, conveying means connected to said screening means, sacking means connected to said conveying means, wheels for said carriage, and means for driving the various parts from said wheels.

6. In a harvester, the combination with a carriage, of a pulling mechanism bodily adjustable transversely on said carriage, a conveying mechanism juxtaposed to said pulling mechanism, screening means connected to said beater, a blower fan adapted to aid said screening means, a shield coöperating with said screening means, conveying means connected to said screening means, and sacking means connected to said conveying means.

7. In a harvester, the combination with a carriage, of a frame on said carriage, transverse shafts on said frame, a pulling frame slidingly supported on said shafts, pulling chains on said pulling frame, and means for adjusting said pulling frame from the carriage.

8. In a harvester, the combination with a carriage, of wheels for supporting said carriage, transverse shafts supported from said carriage, a pulling frame slidingly supported on said shafts, pulling chains having staggered fingers rotatably supported on said pulling frame, means for adjusting said frame from said carriage, and means for driving said pulling chains from the wheels of said carriage in any adjusted position of said pulling frame.

9. In a harvester, the combination with a carriage, of a pair of shafts supported on said carriage, a frame slidingly supported on said shafts, pulling chains rotatably supported on said frame, means for adjusting said frame on said shafts, means for driving one of said shafts, and means for driving said pulling chains from said last-mentioned shaft in any adjusted position of said frame.

10. In a harvester, the combination with a carriage, of wheels on said carriage, transverse shafts on said carriage, a frame slidingly supported on said shafts, pulling chains rotatably supported on said frame, means for adjusting said frame on said shafts, a pair of bevel gears splined on one of said shafts, a pair of bevel gears intermeshing with said first mentioned gears and adapted to drive said pulling chains, and driving connections between said wheels and said last-mentioned shaft, said driving connections including a pair of clutches and means for yieldingly holding said clutches in driving relation.

11. In a harvester, the combination with a carriage, of a transverse shaft on said carriage, a frame slidingly supported on said shaft, pulling chains on said frame, driving connections between said pulling chains and said shaft, a clutch disk on said shaft, a clutch disk juxtaposed to said first-mentioned clutch disk, means for driving said last-mentioned clutch disk, and means for securing said clutch disks in yielding, driving relation.

12. In a harvester, the combination with a carriage, of a shaft on said carriage, a frame slidingly supported on said shaft, pulling chains on said frame, means for adjusting said frame on said shaft, comprising a connecting link and a pair of intermeshing sector levers, means for driving said pulling chains from said shaft in any adjusted position of said frame, and an automatically yielding driving means for said shaft.

13. In a harvester, the combination with a carriage, of wheels for said carriage, a transverse shaft on said carriage, a frame slidingly supported on said shaft, pulling chains on said frame, means for adjusting said frame, means for driving said pulling chains from said shaft in any adjusted position of said frame, an automatic slip clutch on said shaft, driving connections between said clutch and said wheels, a pair of endless conveyers connected to said pulling chains, a rotary beater connected to said endless conveyers, a shield adapted to limit the throw of said beater, a pair of superposed screens connected to said beater, means for shaking said screens, conveying means connected to said screen, a spout connected to said conveying means, a sack-supporting means on said spout, and a sack-guard juxtaposed to said sack-supporting means.

14. In a harvester, the combination with a carriage, of wheels for said carriage, a pair of transverse shafts on said carriage, a frame slidingly supported on said shafts, a pair of pulling chains, having staggered teeth, rotatably supported on said frame, means for adjusting said frame on said shafts, driving connections between said chains and one of said shafts, adapted to drive said chains in any adjusted position of said frame on said shafts, a clutch on one of said shafts, a clutch juxtaposed to said first-mentioned clutch, driving connections between said first-mentioned clutch and said wheel, means for yieldingly securing said clutches in driving relation, a pair of endless conveyers juxtaposed to said pulling chains, a rotatable cylinder, having teeth thereon, juxtaposed to said conveyers, a concave, having teeth thereon, coöperating with said cylinder, means for driving said cylinder from said wheel, a shield adapted to limit the throw of said cylinder, a plurality of screens pivotally supported on said carriage, a crank shaft adapted to shake said screens, driving connections between said crank shaft and said wheels, a screw conveyer connected to one of said screens, an elevator connected to said screw conveyer, a spout connected to said elevator, and a sack-supporting means secured to said spout.

In testimony whereof we have signed our names to this specification in the presence of two subscribing witnesses.

JAMES ROBERT FOWLER.
MORRELL JOHN UFFORD.

Witnesses:
B. D. YOUELLS,
FERD RINGOEN.

Copies of this patent may be obtained for five cents each, by addressing the "Commissioner of Patents, Washington, D. C."